United States Patent
Sasaki et al.

(10) Patent No.: US 11,215,309 B2
(45) Date of Patent: Jan. 4, 2022

(54) HEATING DEVICE AND METHOD OF HEATING A HEATED OBJECT USING THE SAME

(71) Applicant: NICHIAS CORPORATION, Tokyo (JP)

(72) Inventors: Akira Sasaki, Tokyo (JP); Toshiyuki Anji, Tokyo (JP); Kenji Iida, Tokyo (JP); Daisaku Seki, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 152 days.

(21) Appl. No.: 15/577,722

(22) PCT Filed: Jul. 1, 2015

(86) PCT No.: PCT/JP2015/069046
§ 371 (c)(1),
(2) Date: Nov. 28, 2017

(87) PCT Pub. No.: WO2017/002241
PCT Pub. Date: Jan. 5, 2017

(65) Prior Publication Data
US 2018/0156373 A1    Jun. 7, 2018

(51) Int. Cl.
*F16L 53/35* (2018.01)
*F16K 49/00* (2006.01)
(Continued)

(52) U.S. Cl.
CPC ............ *F16L 53/35* (2018.01); *F16K 27/003* (2013.01); *F16K 49/00* (2013.01); *F16K 49/002* (2013.01);
(Continued)

(58) Field of Classification Search
None
See application file for complete search history.

(56) References Cited

U.S. PATENT DOCUMENTS

| | | | | | |
|---|---|---|---|---|---|
| 3,272,968 | A | * | 9/1966 | Volker | .............. B23K 9/235 219/535 |
| 3,733,459 | A | * | 5/1973 | Lengstorf | .......... F16K 49/002 219/201 |

(Continued)

FOREIGN PATENT DOCUMENTS

| CN | 1777773 A | 5/2006 |
|---|---|---|
| CN | 101115330 A | 1/2008 |

(Continued)

OTHER PUBLICATIONS

Sep. 29, 2015 International Search Report issued in International Patent Application No. PCT/JP2015/069046.
(Continued)

*Primary Examiner* — Thor S Campbell
(74) *Attorney, Agent, or Firm* — Oliff PLC

(57) ABSTRACT

A heating device for being attached to and heating a heated object that requires to be heated and has an uneven exterior shape. The heating device including: a conductive member having thermal conductivity and being configured to be attached to a recess of the heated object; and a heater configured to cover and heat the heated object and the conductive member in a state where the conductive member is attached to the recess of the heated object. The heater has a portion to be in contact with a bulge portion of the heated object in a state where the conductive member is attached to the recess of the heated object and where the heated object and the conductive member are covered with the heater.

12 Claims, 11 Drawing Sheets

(51) Int. Cl.
*H05B 3/06* (2006.01)
*F16K 27/00* (2006.01)
*H05B 3/26* (2006.01)
*H05B 3/32* (2006.01)

(52) U.S. Cl.
CPC ............... *H05B 3/06* (2013.01); *H05B 3/265* (2013.01); *H05B 3/32* (2013.01); *H05B 2203/016* (2013.01); *H05B 2203/017* (2013.01); *H05B 2203/021* (2013.01)

(56) References Cited

U.S. PATENT DOCUMENTS

| | | | | |
|---|---|---|---|---|
| 6,014,498 | A * | 1/2000 | Ikeda | F16K 49/00 |
| | | | | 219/520 |
| 6,060,691 | A * | 5/2000 | Minami | F16K 49/002 |
| | | | | 219/201 |
| 6,296,007 | B1 * | 10/2001 | Cifune | F16K 1/22 |
| | | | | 137/15.25 |
| 7,456,374 | B2 * | 11/2008 | Gerver | F16K 49/002 |
| | | | | 219/538 |
| 7,677,265 | B2 * | 3/2010 | Shikata | F16K 27/003 |
| | | | | 137/341 |
| 7,726,333 | B2 * | 6/2010 | Hoshi | F16K 27/003 |
| | | | | 137/341 |
| 7,849,873 | B2 * | 12/2010 | Hiratsuka | F16K 49/00 |
| | | | | 137/341 |
| 9,096,931 | B2 * | 8/2015 | Yednak, III | C23C 16/45561 |
| 2006/0225788 | A1 | 10/2006 | Hiratsuka et al. | |
| 2007/0110415 | A1 | 5/2007 | Tanikawa et al. | |
| 2008/0023466 | A1 | 1/2008 | Gerver et al. | |
| 2012/0175083 | A1 | 7/2012 | Yamakage et al. | |

FOREIGN PATENT DOCUMENTS

| | | |
|---|---|---|
| FR | 2 418 600 A1 | 9/1979 |
| JP | H04-064788 A | 2/1992 |
| JP | 2005-098347 A | 4/2005 |
| JP | 2014-007111 A | 1/2014 |
| JP | 5883354 B2 | 3/2016 |
| TW | 414841 B | 12/2000 |
| WO | 2011/055430 A1 | 5/2011 |
| WO | 2012/090829 A1 | 7/2012 |

OTHER PUBLICATIONS

Mar. 23, 2020 Office Action issued in Chinese Patent Application No. 201580081345.7.
Jan. 6, 2021 Office Action issued in Chinese Patent Application No. 201580081345.7.

* cited by examiner

HEATING DEVICE AND METHOD OF HEATING A HEATED OBJECT USING THE SAME

TECHNICAL FIELD

The present invention relates to a heating device and to a method of heating a heated object using the same.

BACKGROUND ART

For example, Patent Literature 1 describes a heater and a heat conductive member that are capable of easily adapting to various shapes of heated members and efficiently heating the heated members without unevenly heating.

Further, Patent Literature 2 describes a heater including a heat source, a first member that is formed of metal plates and includes paired long portions disposed on both sides of a heated object, and paired second members holding the heat source together with the first member.

CITATION LIST

Patent Literature

[Patent Literature 1] JP 2014-7111 A
[Patent Literature 2] WO 2012/090829 A1

SUMMARY OF INVENTION

Technical Problem

For example, a chemical substance such as tetraethoxysilane, which is liquid at normal temperature, is heated and thereafter transferred in a gaseous state for use in manufacturing semiconductors, or for other use. The chemical substance such as tetraethoxysilane is transferred through a pipe in a gaseous state and then is supplied to a reaction furnace or the like of a semiconductor manufacturing apparatus after the flow rate of the chemical substance in gaseous state is adjusted.

A flow channel for such a chemical substance needs to be heated to a predetermined temperature so that the chemical substance is prevented from being liquefied again during the transfer, in particular, during the adjustment of the flow rate. In particular, a periphery of a valve for the adjustment of the flow rate needs to be maintained at a predetermined temperature in order to stably supply the chemical substance to the reaction furnace or the like of the semiconductor manufacturing apparatus.

Generally, pipes and various equipment are complicatedly arranged on the flow channel. The complication also occurs in equipment around the valve on the flow channel. That is, the equipment around the valve includes an valve and pipes connected to the valves, and thus has an uneven exterior shape.

Efficient heating with the conventional heating device is difficult for an heated object that has the uneven exterior shape, such as the equipment around a valve.

It is an object of the present invention to provide a heating device configured to efficiently heat a heated object having an uneven exterior shape. Further, it is another object of the present invention to provide a method of efficiently heating a heated object having an uneven exterior shape.

The above-mentioned objects, other objects of the present invention, and new features become apparent through description in the specification and illustration in the attached drawings.

Solution to Problem

A heating device to solve the above-mentioned problems is for being attached to and heating a heated object that requires to be heated and has an uneven exterior shape. The heating device includes: a conductive member having thermal conductivity and being configured to be attached to a recess of the heated object; and a heater configured to cover and heat the heated object and the conductive member in a state where the conductive member is attached to the recess of the heated object. The heater includes a portion to be in contact with a bulge portion of the heated object in a state where the conductive member is attached to the recess of the heated object and where the heater covers the heated object and the conductive member.

A method to solve the above-mentioned problems is a method of heating a heated device that requires to be heated and has an uneven exterior shape. The method includes: attaching a conductive member having thermal conductivity to the recess of the heated object; covering the heated object and the conductive member with a heater; making a portion of the heater being in contact with the bulge portion of the heated object; and heating the heated object directly with the portion of the heater in contact with the heated object by heat generated from the heater, and heating the heated object through the conductive member with a portion excluding the portion of the heater in contact with the heated object.

Advantageous Effects of Invention

According to the present invention, a heating device can be obtained that efficiently heat an heated object having an uneven exterior shape. Further, according to the present invention, a method can be made that efficiently heat an heated object having an uneven exterior shape.

DESCRIPTION OF EMBODIMENTS

[Heating Device According to an Embodiment of the Present Invention]

A heating device according to an embodiment of the present invention will be described with reference to the drawings.

Figure 1:
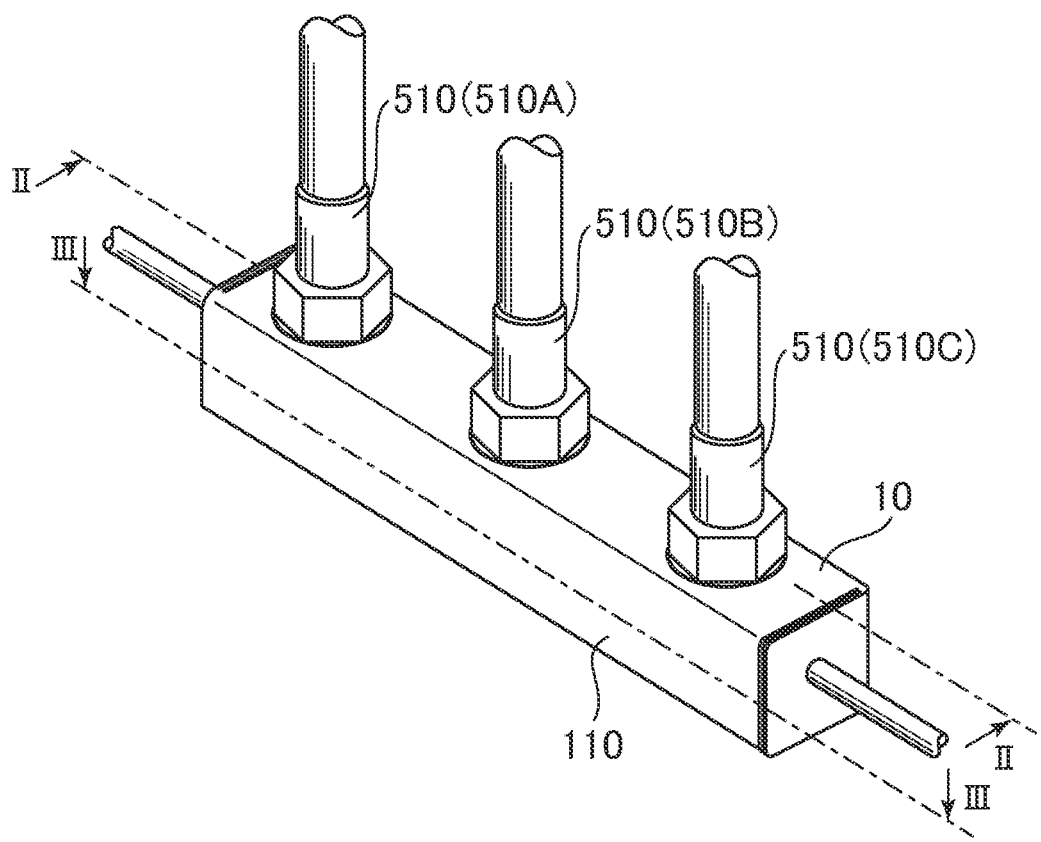
FIG. 1 is a perspective view for illustrating a heating device according to an embodiment of the present invention in a state where the heating device is attached to a heated object.
Figure 2:
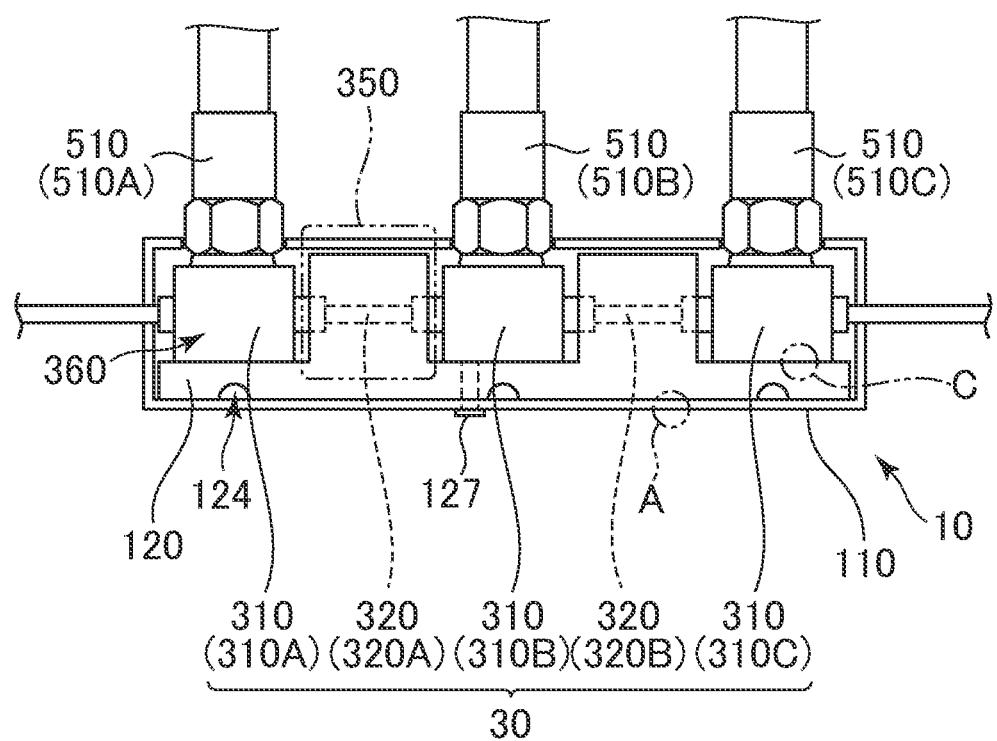
FIG. 2 is a view for illustrating a section taken along the line II-II of FIG. 1.
Figure 3:
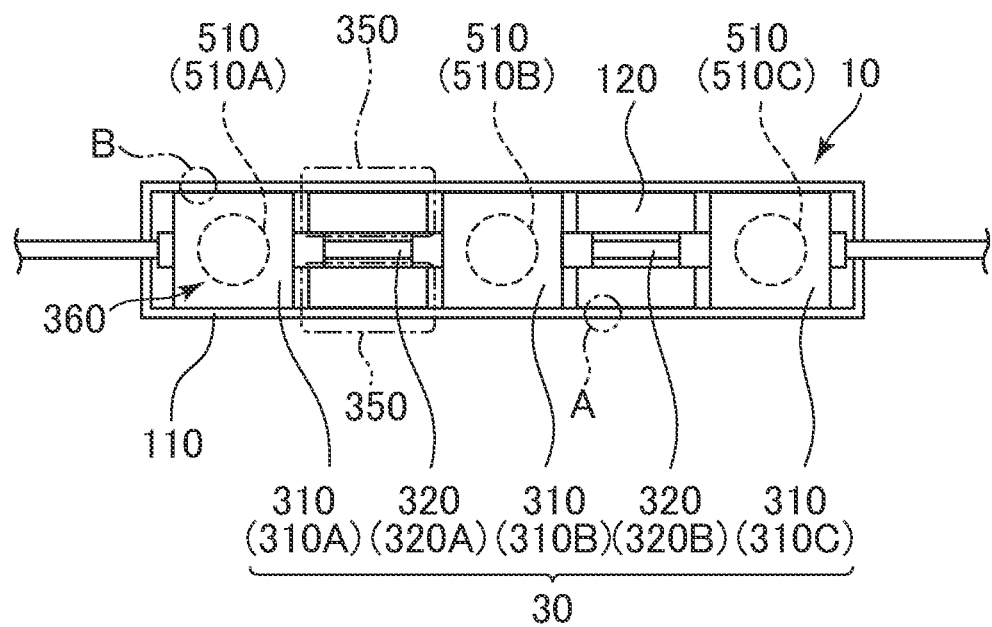
FIG. 3 is a view for illustrating a section taken along the line III-III of FIG. 1.

FIG. 1 is a perspective view for illustrating the heating device according to the present embodiment in a state where the heating device is attached to an heated object. FIG. 2 is a view for illustrating a section taken along the line II-II of FIG. 1. FIG. 3 is a view for illustrating a section taken along the line III-III of FIG. 1.

A heating device 10 according to the present embodiment has the following feature. The heating device 10 is for being attached to and heating a heated object 30 that requires to be heated and has an uneven exterior shape. The heating device 10 includes: a conductive member 120 having thermal conductivity and being configured to be attached to a recess 350 of the heated object 30; and a heater 100 configured to cover and heat the heated object 30 and the conductive member 120 in a state where the conductive member 120 is attached to the recess 350 of the heated object 30. The heater 110 includes a portion to be in contact with a bulge portion 360 of the heated object 30 in a state where the conductive member 120 is attached to the recess 350 of the heated object 30 and where the heater 110 covers the heated object 30 and the conductive member 120.

Herein, the heated object 30 that requires to be heated and has an uneven exterior shape as viewed in an direction may include pipes 320 for transferring fluid and valve casings 310 accommodating valves for adjusting the flow of the fluid. Hereinafter, the explanation will be made on the premise that the heated object 30 includes the pipes 320 for transferring fluid and the valve casings 310 accommodating the valves for adjusting the flow of the fluid.

As illustrated in FIGS. 1, 2, and 3, the heated object 30 is covered with a sheet like heater 110 constructing a part of the heating device 10 according to the present embodiment.

The heated object 30 shown in FIGS. 1, 2, and 3 that requires to be heated and has an uneven exterior shape as viewed in an direction is a tripartite valve that includes a plurality of valve casings 310A, 310B, and 310C accommodating the valves for adjusting the flow of fluid, and pipes 320A and 320B connecting the valve casings 310A, 310B, and 310C to transfer the fluid.

Herein, the uneven exterior shape of the heated object 30 is more specifically described. When the side surface of the heated object 30 is viewed as illustrated in FIG. 2 and the heated object 30 is viewed in the vertical direction as illustrated in FIG. 3, the valve casings 310A, 310B, and 310C constructing parts of the heated object 30 correspond to the bulge portions 360 of the heated object 30, and the pipes 320A and 320B constructing parts of the heated object 30 correspond to the recesses 350 of the heated object 30.

More in detail, the valve casings 310A, 310B, and 310C themselves are the bulge portions 360. Steps caused between the valve casings 310A, 310B, and 310C and the pipes 320A and 320B form the recesses 350. In other words, the recesses 350 are spaces defined by surfaces of the valve casings 310A, 310B, and 310C connected with the pipes 320A and 320B, and by surfaces of the pipes 320A and 320B.

The top portions of the valve casings 310A, 310B, and 310C respectively have actuators 510A, 510B, and 510C mounted thereon that control the drive of the valves. The actuators 510A, 510B, and 510C need not be heated, and hence are not included in the heated object 30.

When the heated object 30 like the tripartite valve illustrated in FIGS. 2 and 3 is simply covered with the sheet like heater 110 without using the conductive member 120, gaps are caused in the recesses 350 in which the pipes 320A and 320B constructing a part of the heated object 30 are located. The presence of the gaps causes heat generated from the heater to be cooled in the gaps, and thus may degrade heating efficiency.

As illustrated in FIGS. 2 and 3, the heating device 10 according to the present embodiment may be constructed such that the conductive member 120 having thermal conductivity is attached in the recesses 350 of the heated object 30 and that portions of the heater 110 are in contact with the conductive member 120 (for example, a portion of the heater 110 is in contact with the conductive member 120 in a location indicated by the reference symbol A in FIGS. 2 and 3). When the conductive member 120 having thermal conductivity is attached in the recesses 350, or when the conductive member 120 having thermal conductivity is attached in the recesses 350 and further the portions of the heater 110 are in contact with the conductive member 120, heat generated from the heater 110 is transferred through the conductive member 120 to the heated object 30. With this, the heating device 10 may more efficiently heat the heated object 30.

Further, as illustrated in FIG. 3, when other portions of the heater 110 are in direct contact with the bulge portions 360 of the heated object 30 (for example, a portion of the heater 110 is in direct contact with the bulge portion 360 in a location indicated by the reference symbol B in FIG. 3), heat generated from the heater 110 is directly transferred to the heated object 30. With this, the heating efficiency of the heating device 10 according to the present embodiment may be further enhanced.

The use of the heating device according to the present embodiment realizes the following heating method for the heated object that requires to be heated and has a uneven exterior shape. The heating method includes: attaching the conductive member having thermal conductivity to the recess of the heated object; covering the heated object and the conductive member with the heater; and bringing the portion of the heater into contact with the bulge portion of the heated object. Further, the heating method includes: directly heating the heated object with the portion of the heater in contact with the heated object by the heat generated from the heater; and heating the heated object through the conductive member with a portion of the heater excluding the portion in contact with the heated object by the heat generated from the heater.

Further, as illustrated in FIG. 2, the heating device 10 according to the present embodiment may be constructed such that, in a state where the conductive member 120 is attached in the recesses 350 of the heated object 30, and then the heated object 30 and the conductive member 120 are covered with the heater 110, portions of the conductive member 120 are in contact with the heated object 30 (for example, a portion of the conductive member 120 is in contact with the heated object 30 in a location indicated by the reference symbol C in FIG. 2). With this, the heating efficiency of the heating device 10 according to the present embodiment may be further enhanced.

Next, configurations of the heating device according to the present embodiment will be described.

Figure 4:
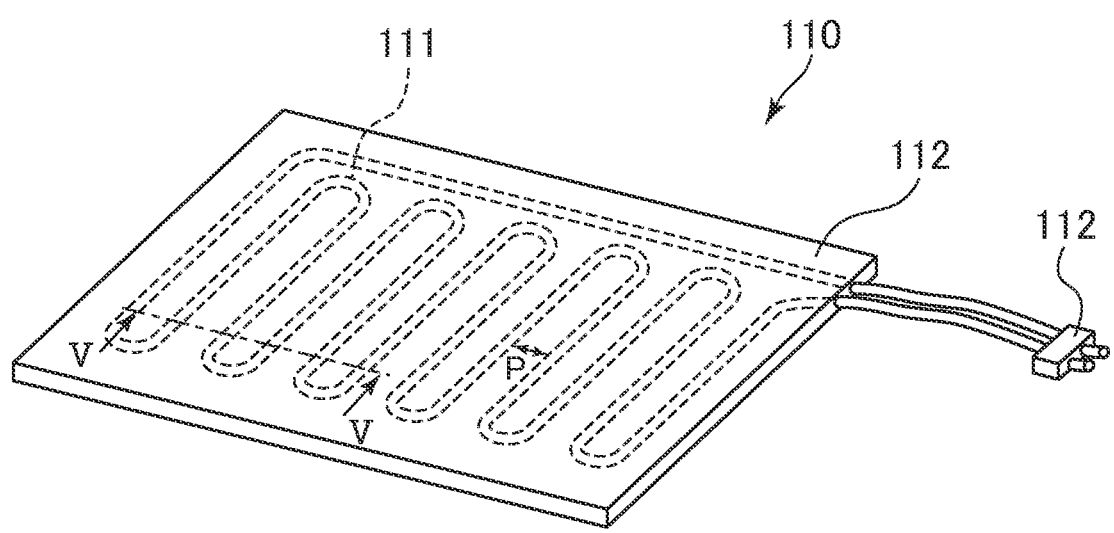
FIG. 4 is a perspective view for illustrating a heater constructing a part of the heating device according to the present embodiment.
Figure 5:
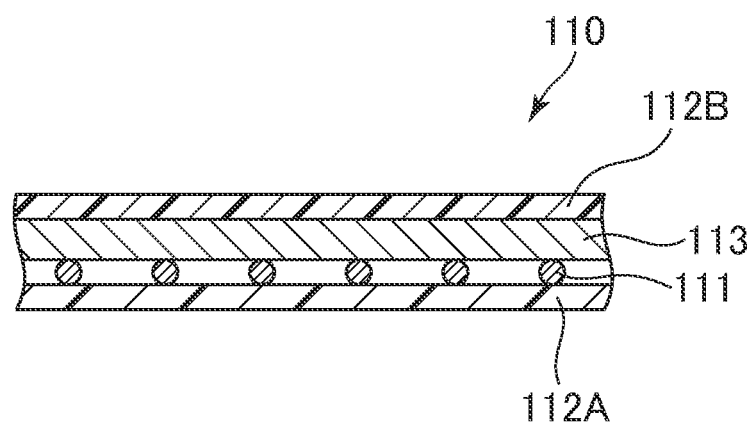
FIG. 5 is a view for illustrating an example of a section taken along the line V-V of FIG. 4.

FIG. 4 is a perspective view for illustrating the heater constructing a part of the heating device according to the present embodiment. FIG. 5 is a view for illustrating an example of a section taken along the line V-V of FIG. 4.

As illustrated in FIG. 4, the heater 110 constructing a part of the heating device 10 according to the present embodiment may be formed like a sheet. Further, the heater 110 constructing a part of the heating device 10 according to the present embodiment has flexibility or softness so as to be able to freely surround a periphery of the heated object or the like.

At least one heater 110 formed like a sheet is used to cover the periphery of the heated object or the like.

The heater 110 constructing a part of the heating device according to the present embodiment may include an enveloper 112 and a heat source 111 arranged inside the enveloper 112.

For example, as illustrated in FIG. 4, the heater 110 constructing a part of the heating device 10 according to the present embodiment includes, as the heat source 111, a heating wire (electric heating wire) arranged in the entire inside of the heater 10 so that heat is emitted from the whole of the heater 110. The heating wire receives electricity through a plug 112 connected with an external power source to generate heat.

As illustrated in FIG. 5, the heater 110 may include, as the enveloper 112, an inner layer 112A arranged on a side facing the heated object 30 and an outer layer 112B arranged on a side opposite to the side facing the heated object 30. The inner layer 112A and the outer layer 112B may be formed of different materials.

Each of the inner layer 112A and the outer layer 112B constructing the enveloper 112 may be formed of a fluororesin sheet made of a fluorine-based resin, such as polytetrafluoroethylene (PTFE), a tetrafluoroethylene-perfluoroalkoxyethylene copolymer (PFA), a tetrafluoroethylene-hexafluoropropylene copolymer (FEP), polychlorotrifluoroethylene (PCTFE), a tetrafluoroethylene-ethylene copolymer (ETFE), a chlorotrifluoroethylene-ethylene copolymer (ECTFE), or polyvinylidene fluoride (PVDF). Alternatively, each of the inner layer 112A and the outer layer 112B may be formed of a fluororesin fiber cloth (woven fabric) obtained by weaving fibers of the above-mentioned fluorine-based resin. Further, each of the inner layer 112A and the outer layer 112B may be formed of an inorganic fiber cloth (woven fabric) made of inorganic fibers as typified by glass fibers, alumina fibers, and the like, or may be formed of an inorganic fiber cloth coated with fluororesin obtained by coating the above-mentioned inorganic fiber cloth with a fluorine-based resin.

Further alternatively, each of the inner layer 112A and the outer layer 112B may be formed of a resin having heat resistance and a lower melting point than that of the fluorine-based resin, such as polyamide, polycarbonate, polyacetal, polybutylene terephthalate, modified polyphenylene ether, polyphenylene sulfide, polysulfone, polyethersulfone, polyarylate, polyether ether ketone, polyphthalamide, polyimide, polyether imide, or polymethylpentene.

The thickness of the enveloper 112 is not limited as long as the effect of the present invention can be obtained. Thickness of from 0.1 mm to 8 mm is appropriate for the enveloper 112. Thickness of from 0.1 mm to 5 mm is preferred, and thickness of from 0.1 mm to 2 mm is more preferred.

Further, the material of the heat source 111 is not limited as long as the watt density thereof is 0.15 W/cm$^2$ or higher. For example, the heat source 111 may be a heating wire (electric heating wire) that generates heat by receiving electricity such as a nichrome wire, a stainless steel wire.

Further, it is preferred that the above-mentioned electric heating wires be electrically insulated. The insulation may be achieved by covering the electric heating wire with an inorganic fiber sleeve made of inorganic fibers as represented by glass fibers and alumina fibers. Alternatively, the insulation may be achieved by coating the electric heating wire with resin. A carbon heat source or a ceramic heat source may be used in place of the electric heating wire.

Watt density is also called power density. In the present specification, the watt density means the surface power (W/cm$^2$) of the heater expressed by the electric power (W) per unit surface area (cm$^2$) of the jacket heater. Generally, the higher the watt density becomes, the higher the surface temperature of the heater becomes. Conversely, the lower the watt density becomes, the lower the surface temperature of the heater becomes.

There is no limitation on an upper limit of the watt density. It is preferred that the watt density be 0.5 W/cm$^2$ or less, specifically from 0.15 W/cm$^2$ to 0.5 W/cm$^2$. The watt density may also be from 0.17 W/cm$^2$ to 0.5 W/cm$^2$, from 0.20 W/cm$^2$ to 0.5 W/cm$^2$, or from 0.25 W/cm$^2$ to 0.5 W/cm$^2$.

The electric heating wire may be sewed onto a base member (not shown) with a sewing string in a desired pattern. The base member may employ an inorganic fiber cloth made of inorganic fibers as represented by glass fibers and alumina fibers.

Further, an interval (hereinafter also referred to as a pitch: the pitch P in FIG. 4) between adjacent electric heating wires may be set from about 10 mm to about 35 mm. Preferably, the interval may be set from 40 mm to 70 mm, or from 45 mm to 60 mm, to secure thermal uniformity.

Further, as illustrated in FIG. 5, the heater 110 constructing a part of the heating device 10 according to the present embodiment may include a heat insulating material 113. The heat insulating material 113 may be formed of an inorganic fiber mat obtained by gathering glass fibers, ceramic fibers, silica fibers, or the like and subjecting the gathered fibers to needle processing.

There is no limitation for the thickness of the heat insulating material 113. The thickness of the heat insulating material 113 may be, for example, from 5 mm to 100 mm, from 5 mm to 50 mm, or from 8 mm to 30 mm.

Figure 6:
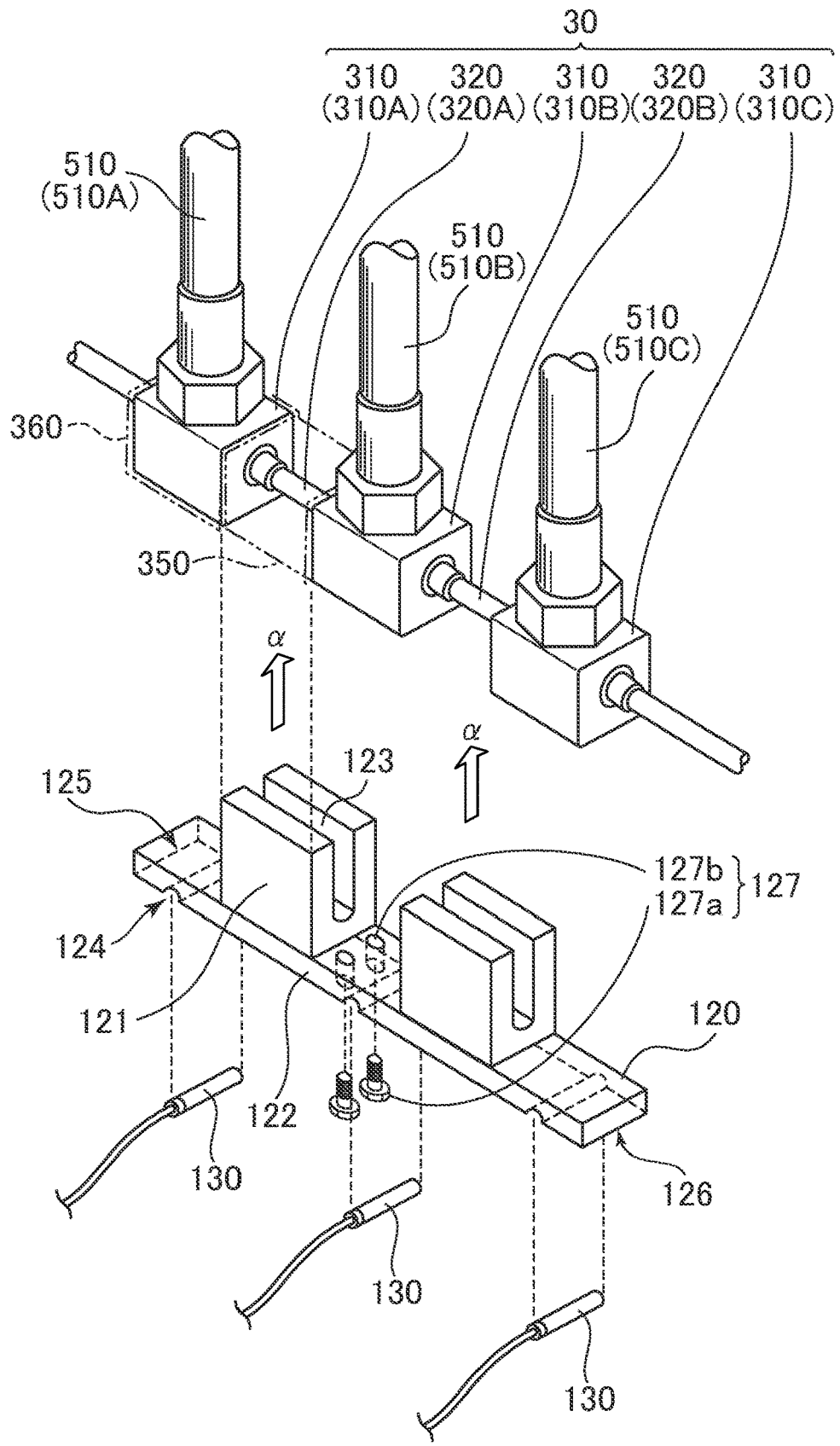
FIG. 6 is an exploded perspective view for illustrating a conductive member constructing a part of the heating device according to the present embodiment in a state where the conductive member is attached to the heated object.

Next, the conductive member 120 constructing apart of the heating device according to the present embodiment will be described. FIG. 6 is an exploded perspective view for illustrating the conductive member constructing a part of the heating device according to the present embodiment in a state where the conductive member is attached to the heated object. The conductive member 120 is configured to be attached in the recesses 350 of the heated object 30 as described above.

The conductive member 120 is used in the heating device 10 for being attached to and heating the heated object 30 that requires to be heated and has an uneven exterior shape as viewed from an direction. The conductive member 120 is configured to be attached in the recesses 350 of the heated object 30.

Further, in order to enhance attachablity, the conductive member 120 is configured to be attached in the recesses 350 of the heated object 30 in only one predetermined direction. More specifically, the conductive member 120 of the present embodiment is configured to fit in the recesses 350 of the heated object 30 in the direction indicated by the arrow a of FIG. 6.

Further, the conductive member 120 of the present embodiment may be configured to fit in the recesses 350 of the heated object 30 from the lower side of the heated object 30 in the vertical direction.

Further, the conductive member 120 has a bulge portion 121 conforming to the shape of the recess of the heated object 30. Further, as illustrated in FIG. 6, in a case where the heated object 30 has a plurality of recesses 350, the conductive member 120 may have a plurality of bulge portions 121 respectively conforming to the shapes of the plurality of recesses 350 of the heated object 30.

The conductive member 120 constructing apart of the heating device 10 according to the present embodiment may include a plurality of bulge portions 121 conforming to the shapes of the plurality of recesses 350 of the heated object 30, and a connection portion 122 connecting the plurality of bulge portions 121.

The conductive member 120 may be configured such that the bulge portions 121 of the conductive member 120 are attached in the recess 350 of the heated object 30 and at least one surface of the bulge portion 360 of the heated object 30 is exposed. The at least one exposed surface of the heated object 30 may be in contact with a part of the heater 110.

The conductive member 120 may include bulge portions 121 conforming to the shapes of the recesses 350 of the heated object 30 and a connection portion 122 connected to the bulge portion 121. Further, the connecting portion 122 of the conductive member 120 may be configured to be in contact with the bulge portions 360 of the heated object 30 and may include a fixing portion 127 for fixing the conductive member 120 to the heated object 30. The fixing portion 127 is configured to fix the position of the conductive member 120 to the heated object 30.

The fixing portion 127 may be realized with, for example, a screw 127a and a screw hole 120b that fix the heated object 30 and the conductive member 120 to each other. Alternatively, the fixing portion 127 may be realized with an adhesive layer (not shown) that is interposed between the heated object 30 and the conductive member 120 to make the heated object 30 and the conductive member 120 adhere to each other.

As shown in FIG. 6, the fixing portion 127 may be positioned on the lower side of the heated object 30 in the vertical direction and fix positions of the heated object 30 and the conductive member 120 on the loser side of the heated object 30 in the vertical direction.

As described below, the conductive member 120 may be formed of metal for obtaining high thermal conductivity. The conductive member 120 formed of metal has large weight, and hence a large load is exerted on the heated object 30.

As shown in FIG. 6, when the heated object 30 includes, for example, the pipes 310 and the valve casings 320, the load exerted on the pipes 310 in the circumferential direction of the pipes 310 may cause disadvantageous influence on the connection between the pipes 310 and the valve casings 320.

Since the fixing portion 127 is positioned on the lower side of the heated object 30 in the vertical direction and fixes the positions of the heated object 30 and the conductive member 120 on the lower side of the heated object 30 in the vertical direction, the load exerted on the pipes 310 constructing a part of the heated object 30 in the circumferential direction of the pipes 310 is reduced, and thereby the disadvantageous influence on the connection between the pipes 310 and the valve casings 320 is avoided.

The conductive member 120 constructing apart of the heater device 10 according to the present embodiment may be an unitary member that is formed in advance so as to fill the recesses 350 of the heated object 30.

That is, the conductive member 120 may be an unitary member obtained by integrally forming the bulge portions 121 of the conductive member 120 and the connection portion 122 of the conductive member 120. More specifically, in a case where the conductive member 120 is formed of metal, the conductive member 120 may be an unitary member obtained by integrally molding the bulge portions 121 of the conductive member 120 and the connection portion 122 of the conductive member 120 through a manufacturing method such as forging or casting. Alternatively, the conductive member 120 may be an unitary member obtained by unifying the bulge portions 121 of the conductive member 120 and the connection portion 122 of the conductive member 120 with an adhesive, a fixing tool, or the like.

The conductive member 120 that is an unitary member as described above may advantageously further enhance attachablity and enhance the heat transfer efficiency in the conductive member 120.

When the heated object 30 includes the pipes 320 for transferring fluid and the valve casings 310 accommodating the valves for adjusting the flow of the fluid as in the example of the present embodiment, the bulge portions 121 of the conductive member 120 conforming to the shapes of the recesses 350 of the heated object 30 have cutouts 123 formed along the pipes 320.

Since the pipes 320 constructing a part of the heated object 30 is received in the cutouts 123 of the conductive member 120, substantially the entire periphery of the pipes 320 is subject to the heat radiated from the conductive member 120. As a result, heating efficiency is enhanced.

For enhancement of the heating efficiency, it is important that the heating device 10 according to the present embodiment be constructed such that a portion of the heater 110 is in contact with the heated object 30 and that another portion of the heater 110 is in contact with the conductive member 120.

Thus, with regard to the conductive member 120 constructing apart of the heating device 10 according to the present embodiment, it is important that a part of the heated object 30 be exposed in a state where the conductive member 120 is attached in the recesses 350 of the heated object 30. More specifically, it is important that the conductive member 120 be attached on the heated object 30 such that the bulge portions 360 constructing a part of the heated object 30 are exposed in a state where the conductive member 120 is attached in the heated object 30 having an uneven exterior shape.

The conductive member 120 may be attached to the heated object 30 without covering a member other than the heated object 30. That is, the conductive member 120 constructing a part of the heating device 10 according to the present embodiment may be formed so as to positionally avoid a member other than the heated object 30 that requires to be heated.

More specifically, in FIG. 6, actuators 510 for controlling opening and closing of the valves inside the valve casings are disposed on the upper sides of the valve casings 310, respectively. The actuators 510 do not require to be heated, and hence the conductive member 120 is attached to the heated object 30 without covering the actuators 510.

As illustrated in FIG. 6, a detector 130 for detecting temperature of the heated object 30 may be provided to the conductive member 120. Referring to FIG. 6, the conductive member 120 has a second cutout 124 formed thereon for receiving the detector 130 for monitoring heating state, in addition to the cutouts 123 formed along parts of the heated object 30 (the pipes 320 in FIG. 6). The detector 130 may employ, for example, thermocouple.

As described above, since the second cutout 124 is formed in the conductive member, and the detector 130 is received in the second cutout 124, temperature at positions close to the heated object 30 can be monitored. Control of the heater 110 based on data of the temperature monitored by the detector 130 is advantageous for enhancement of energy efficiency during the use of the heating device 10.

As illustrated in FIG. 6, the detector 130 may be located in the connection portion 122 of the conductive member 120. That is, the second cutout 124 conforming to the shapes of the detector 130 may be formed in the connection portion 122 of the conductive member 120 to receive the detector 130 in the second cutout 124.

As illustrated in FIG. 6, the second cutout 124 formed in the conductive member 120 may be formed, for example, in another surface 126 of the heated object 30. The surface 126 is a surface opposite to the one surface 125 of the conductive member 120 that is in direct contact with the bulge portions 360 (the bulge portions 360 correspond to the valve casings 310 in FIG. 6) of the heated object 30. In this case, the detector 130 monitor temperature of the heated object 30 through intermediation of the conductive member 120.

Alternatively, the second cutout 124 formed in the conductive member 120 may be formed in the one surface 125 of the conductive member 120 that is indirect contact with the bulge portions 360 (the bulge portions 360 correspond to the valve casings 310 in FIG. 6) of the heated object 30. In this case, the detector 130 directly monitors the temperature of the heated object 30 without intermediation of the conductive member 120.

As illustrated in FIG. 6, a plurality of second cutouts 124 may be formed in the conductive member 120. Further, the heating device 10 may include a plurality of detectors 130 conforming respectively to the plurality of second cutouts 124 formed in the conductive member 120.

In FIG. 6, the plurality of second cutouts 124 formed in the conductive member 120 are formed at positions close to the plurality of bulge portions 360 on the surface 126. The surface 126 is opposite the one surface 125 of the conductive member 120 that is in direct contact with the plurality of bulge portions 360 of the heated object 30.

The conductive member 120 may be formed of a material having a thermal conductivity of 1.0 W/(m·K) or higher at 20° C. The conductive member 120 formed of the material having a thermal conductivity of 1.0 W/(m·K) or higher at 20° C. further enhances the effect of the present invention.

Further, the conductive member 120 may be formed of a material having a thermal conductivity of 100 W/(m·K) or higher at 20° C., or may be formed of a material having a thermal conductivity of 200 W/(m·K) or higher at 20° C.

The conductive member 120 may be formed of metal. More specifically, the conductive member may be formed of aluminum. The conductive member 120 formed of metal such as aluminum, which is lighter than iron, can advantageously reduce the load applied to the heated object 30, when the conductive member 120 is attached to the heated object 30.

The heating device 10 described above is a heating device configured to efficiently heat the heated object 30 having an uneven exterior shape.

[Heating Device According to Another Embodiment of the Present Invention]

Hereinafter, a heating device 20 according to second embodiment configured to heat an heated object 40 will be described. The shape of the heated object 40 to be heated by the heating device 20 according to the second embodiment is different from the shape of the heated object 30 to be heated by the heating device 10 according to the previously described embodiment described above.

A conductive member 220 constructing apart of the heating device 20 according to the second embodiment has a shape conforming to the heated object 40 that is a heating target. That is, the heating device 20 according to the second embodiment is different from the heating device 10 according to the previous embodiment in the shape of the heated object.

A configuration of the heating device 20 according to the second embodiment other than the conductive member 220 is the same as the configuration of the heating device 10 according to the previously described embodiment, and hence detailed description thereof is omitted.

Figure 7:
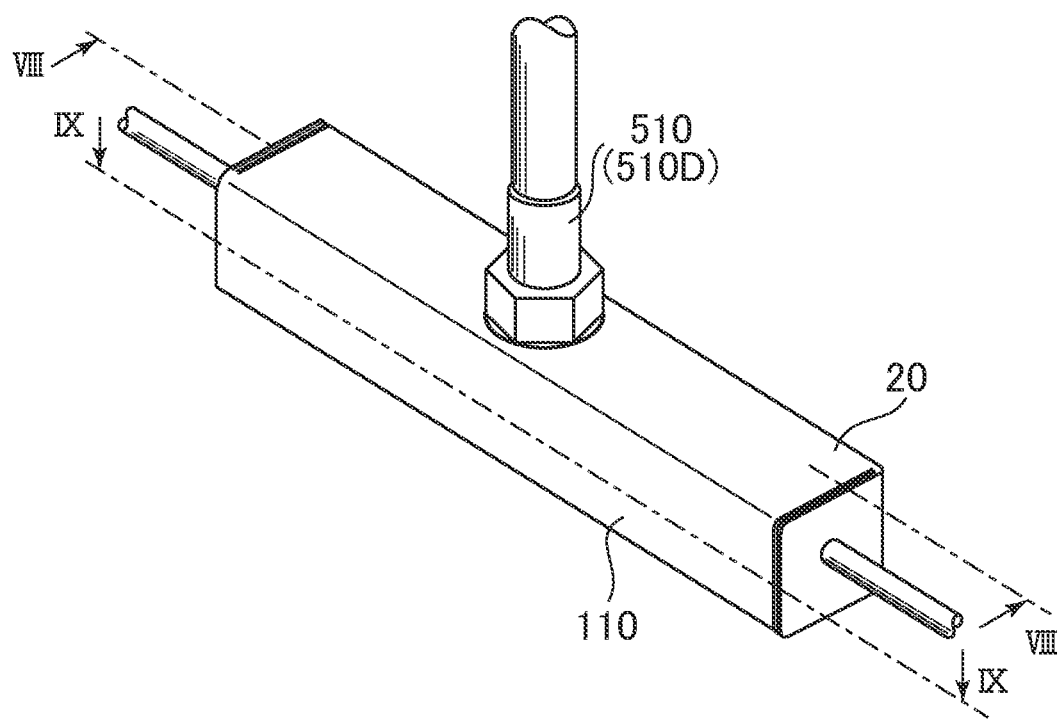
FIG. 7 is a perspective view for illustrating a heating device according to another embodiment of the present invention in a state where the heating device is attached to an heated object.
Figure 8:
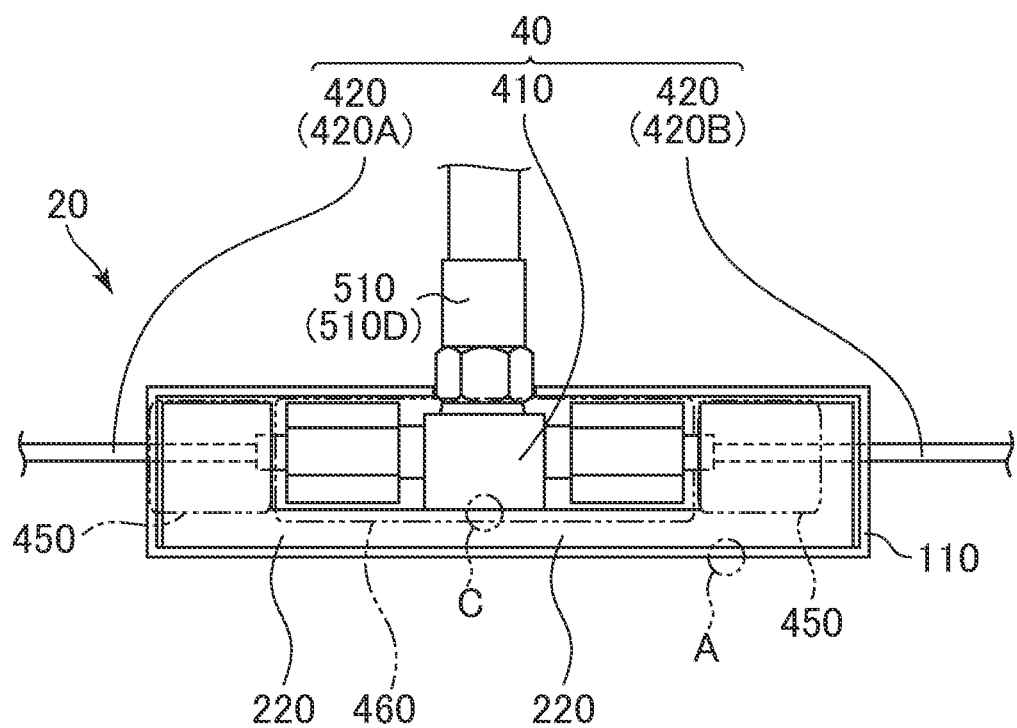
FIG. 8 is a view for illustrating a section taken along the line VIII-VIII of FIG. 7.
Figure 9:
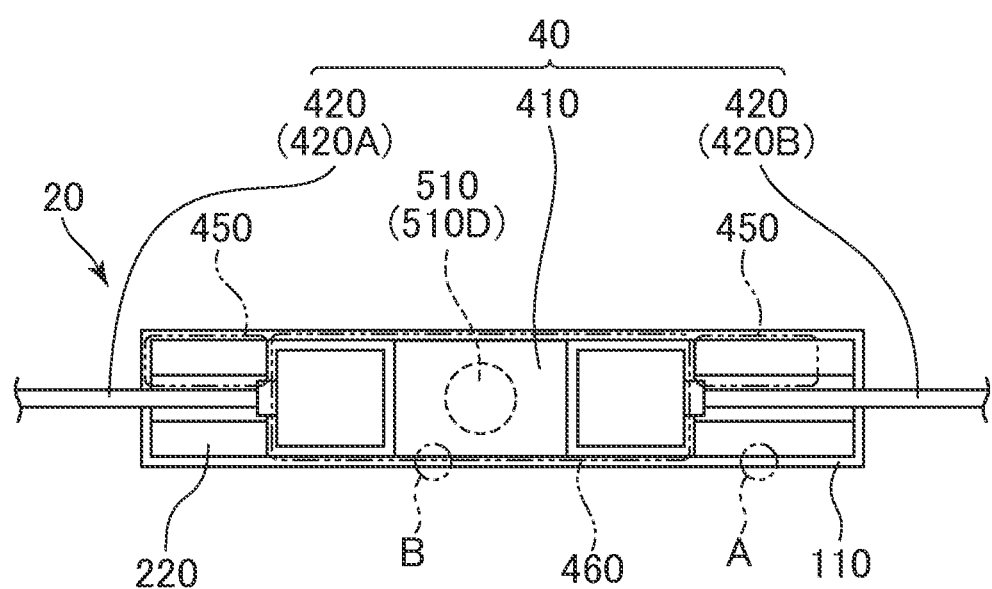
FIG. 9 is a view for illustrating a section taken along the line IX-IX of FIG. 7.

FIG. 7 is a perspective view for illustrating the heating device according to the second embodiment in a state where the heating device is attached to the heated object. FIG. 8 is a view for illustrating a section taken along the line VIII-VIII of FIG. 7. FIG. 9 is a view for illustrating a section taken along the line IX-IX of FIG. 7.

The heated object 40 includes one valve casing 410 accommodating a valve for adjusting a flow of fluid, and pipes 420A and 420B that are arranged on both sides of the valve casing 410, for transferring the fluid.

The top of the valve casing 410 has an actuator 510D disposed thereon configured to control the drive of the valve is mounted. The actuator 510D need not be heated, and hence is not included in the heated object 40.

When the heated object 40 is viewed in FIGS. 8 and 9, since the pipes are arranged on both sides of the valve casing 410, recesses 450 are caused on the both sides of the valve casing 410. When the heated object 40 is simply covered with, for example, the sheet like heater 110, it is difficult to efficiently heat the recesses 450 close to the valve casing 410.

As illustrated in FIGS. 8 and 9, in the heating device 20 according to the second embodiment, the conductive member 220 having thermal conductivity may be attached to the recesses 450 of the heated object 40, and a portion of the heater 110 is in contact with the conductive member 220 (for example, the heater 110 is in contact with the conductive member 220 at a location indicated by the reference symbol A in FIGS. 8 and 9).

When the conductive member 220 having thermal conductivity is attached to the recesses 450, or when the conductive member 220 having thermal conductivity is attached to the recesses 450 and further a portion of the heater 110 is in contact with the conductive member 220, heat generated from the heater 110 is transferred to the heated object 40 through intermediation of the conductive member 220. With this, the heating device 20 more efficiently heats the heated object 40.

As illustrated in FIG. 9, another portion of the heater 110 is in direct contact with a bulge portion 460 of the heated object 40 (for example, a portion of the heater 110 is in direct contact with the bulge portion 460 at the location indicated by the reference symbol B in FIG. 9).

With this, heat generated from the heater 110 is directly transferred to the heated object 40. Thus, the heating efficiency of the heating device 20 according to the second embodiment is further enhanced.

Further, as illustrated in FIG. 8, with regard to the heating device 20 according to the second embodiment, the conductive member 220 may be formed such that a portion of the conductive member 220 is in contact with the heated object 40 in a state where the conductive member 220 is attached to the recesses 450 of the heated object 40 and the heated object 40 and the conductive member 220 are covered with the heater 110 (for example, a portion of the conductive member 220 is in contact with the heated object 40 at the location indicated by the reference symbol C in FIG. 8). With this, the heating efficiency of the heating device 20 according to the second embodiment is further enhanced.

Figure 10:
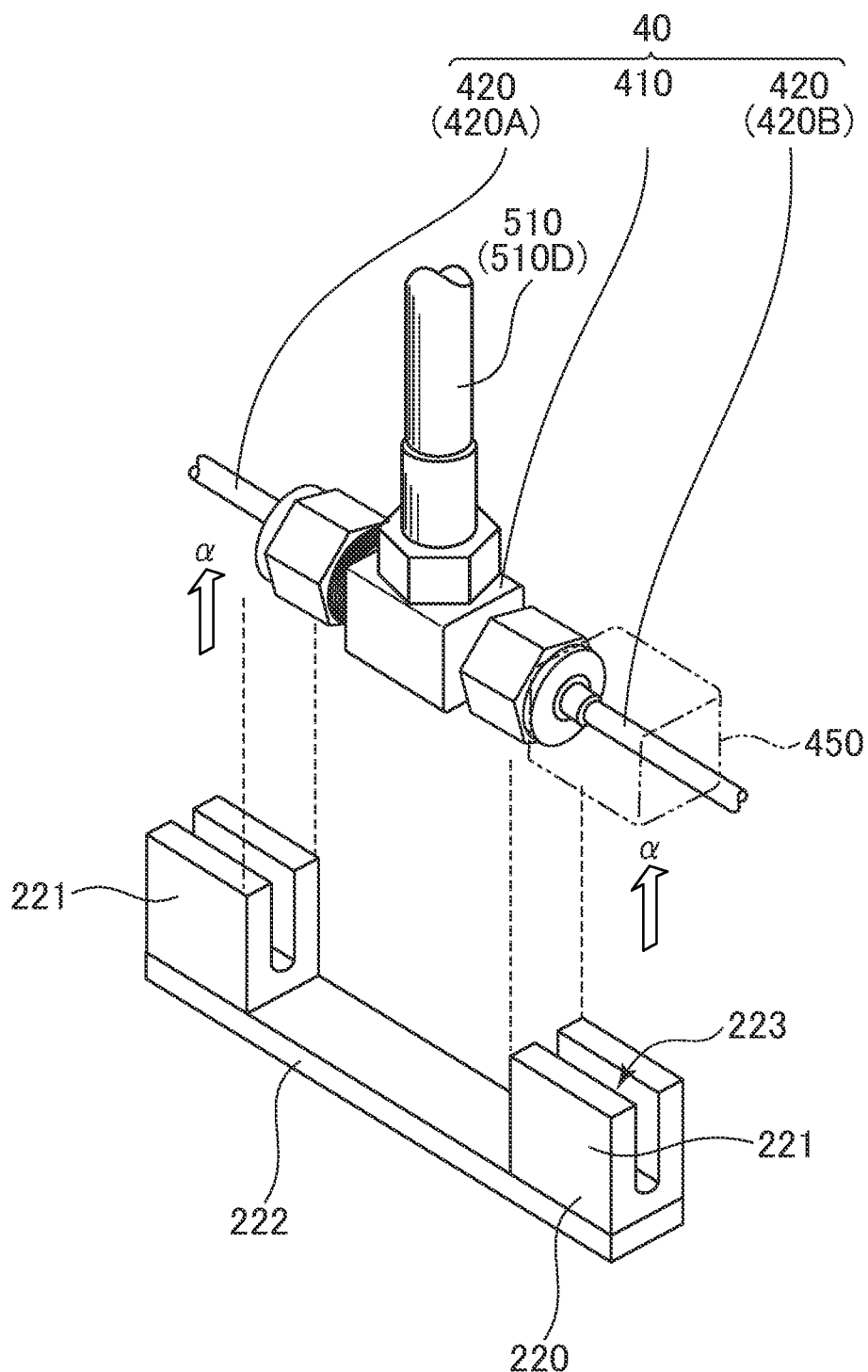
FIG. 10 is an exploded perspective view for illustrating a conductive member constructing a part of the heating device according to the another embodiment in a state where the conductive member is attached to the heated object.

FIG. 10 is an exploded perspective view for illustrating the conductive member constructing a part of the heating device according to the second embodiment in a state where the conductive member is attached to the heated object. The conductive member 220 is configured to be attached to the recesses 450 of the heated object 40 as described above.

That is, the conductive member 220 is used in the heating device 20 for being attached to and heating the heated object 40 that requires to be heated and that has an uneven exterior shape as viewed in an direction. The conductive member 220 is configured to be attached to the recesses 450 of the heated object 40.

Further, in order to enhance attachablity, the conductive member 220 is configured to be attached to the recesses 450 of the heated object 40 in only one predetermined direction. More specifically, the conductive member 220 of the second embodiment can fit to the recesses 450 of the heated object 40 in the direction indicated with the arrow a of FIG. 10.

Further, the conductive member 220 includes bulge portions 221 conforming to the recesses of the heated object 40. Further, as illustrated in FIG. 10, in a case where a plurality of recesses 450 are present in the heated object 40, the conductive member 220 may have a plurality of bulge portions 221 conforming to the shapes of the plurality of recesses 450 of the heated object 40.

The conductive member 220 constructing apart of the heating device 20 according to the second embodiment may include a plurality of bulge portions 221 conforming to the shapes of the plurality of recesses 450 of the heated object 40, and a connection portion 222 connecting the plurality of bulge portions 221.

The conductive member 220 constructing apart of the heating device 20 according to the second embodiment may be an unitary member formed in advance so as to fill the recesses 450 of the heated object 40.

The conductive member 220 that is au unitary member enhances attachablity and enhance transfer efficiency of heat in the conductive member 220.

When the heated object 40 includes the pipes 420 for transferring fluid and the valve casings 410 accommodating the valve for adjusting the flow of the fluid as in the example of the second embodiment, the bulge portions 221 of the conductive member 220, which conforms to the recesses 450 of the heated object 40, has cutouts 223 formed along the pipes 420.

When the pipes 420 constructing a part of the heated object 40 are received in the cutouts 223 of the conductive member 220, a substantially entire periphery of the pipe 420 is subject to heat radiated from the conductive member 220. Thus, the heating efficiency is enhanced.

The heating device 20 described above is configured to efficiently heat the heated object 40 having an uneven exterior shape.

In the heated object 40, when the joint 430 connecting the valve casing 410 and the pipes 420 is smaller than the valve casing 410, the joint 430 may be regarded as a part of the pipes 420 and the conductive member 220 may cover the joint 430 and the pipe 420.

Figure 11:
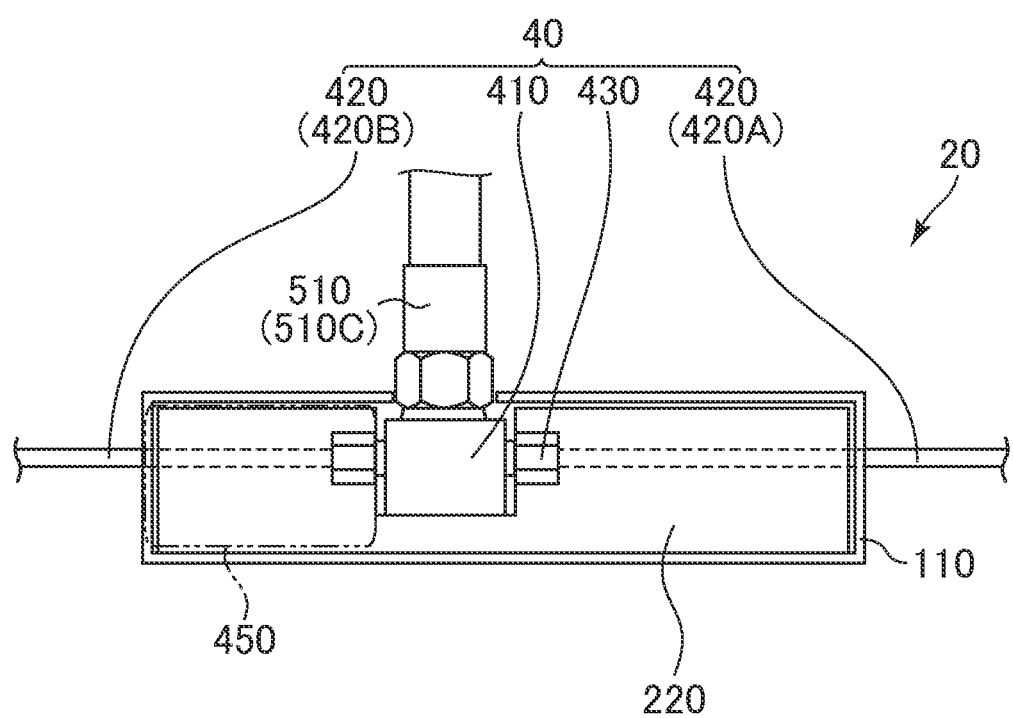
FIG. 11 is a sectional view for illustrating a modified example of the heating device according to the another embodiment in a state where the heating device is attached to the heated object.

FIG. 11 is a sectional view for illustrating a modified example of the heating device according to the second embodiment in a state where the heating device is attached to the heated object.

As described above, the heater device 20 including the conductive member 220 attached to the recesses 450 of the heated object 40 effectively heats the heated object 40 having the uneven exterior shape.

The configuration of the heating device is not limited to those of the previously described embodiment and the second embodiment, and can be modified within the gist of the present invention. For example, with regard to the uneven exterior shape of the heated object, for example the valve body itself of the heated object may have a uneven exterior shape. In this case, the conductive member (bulge portion) may be conformed to the recess of the valve body. Alternatively, the conductive member of the heater device may have only the bulge portion conforming to the recess of the heated object (for example, a space around the pipe). In the above described embodiment, the fixing portion is positioned on the lower side (in other words, the bottom side) of the heated object in the vertical direction, and fixes the positions of the heated object and the conductive member on the lower side of the heated object in the vertical direction. Alternatively, the fixing portion may be located at a predetermined position (for example, a position on the lateral side or a position on the upper side) of the heated object, and may fix the positions of the heated object and the conductive member on a predetermined side (for example, on the lateral side or on the upper side) of the heated object.

REFERENCE SIGNS LIST 10, 20 heating device; 30, 40 heated object; 110 heater; 120, 220 conductive member; 310, 410 valve casing; 320, 420 pipe; 350 recess; 360 bulge portion

The invention claimed is:

1. A heating device for being attached to and heating a heated object that requires to be heated and has an uneven exterior shape, the heating device comprising:
   a conductive member having thermal conductivity and being configured to be attached to a recess of the heated object; and
   a heater configured to cover and heat the heated object and the conductive member in a state where the conductive member is attached to the recess of the heated object,
   wherein
   the heater includes a portion configured to be in contact with a bulge portion of the heated object in a state where the conductive member is attached to the recess of the heated object and where the heater covers the heated object and the conductive member, the conductive member includes a connection portion and a bulge portion, the bulge portion of the conductive member having a shape conforming to a shape of the recess of the heated object, the bulge portion of the conductive member includes:
a first portion having a first surface that is directly adjacent to a first side of the heater;
a second portion having a second surface that is directly adjacent to the first side of the heater; and
a third surface that is in contact with a first side of the connection portion, the first side of the connection portion being positioned opposite to a second side of the connection portion, and the second side of the connection portion being in direct contact with a second side of the heater, which is opposite to the first side of the heater, and a cutout is formed between the first portion and the second portion, and a pipe of the heated object is disposed in the cutout between the first portion and the second portion, each of the first portion and the second portion extending in a first direction towards the pipe from a proximal portion of the bulge portion of the conductive member, the pipe having a first end and a second end on an outer periphery surface of the pipe, the first end and the second end being located at ends in the first direction on the outer periphery surface of the pipe, the first end and the second end being respectively located on two opposing sides separated by a diameter of the pipe, the diameter extending in a second direction perpendicular to the first direction, and each of the first portion and the second portion extending beyond both of the first end and the second end on the outer periphery of the pipe of the heated object in the first direction.

2. The heating device according to claim 1, wherein the conductive member is formed of a material having a thermal conductivity of 1.0 W/(m·K) or higher.

3. The heating device according to claim 1, wherein the pipe of the heated object transfers fluid, and
the heated object includes the pipe and a valve casing accommodating a valve for adjusting a flow of the fluid, the conductive member is configured to be attached to the pipe, and
in a state where the conductive member is attached to the pipe, the portion of the heater is in contact with the valve casing, and another portion of the heater is in contact with the conductive member.

4. The heating device according to claim 1, wherein the conductive member is configured to be attached to the recess of the heated object in only one predetermined direction.

5. The heating device according to claim 1, wherein, the conductive member includes a portion configured to be in contact with the heated object in the state where the conductive member is attached in the recess of the heated object and in which the heater covers the heated object and the conductive member.

6. The heating device according to claim 1, wherein
the connection portion of the conductive member includes a fixing portion configured to fix the conductive member to the heated object.

7. The heating device according to claim 6, further comprising a detector for detecting temperature of the heated object, wherein
the detector is disposed on the connection portion of the conductive member.

8. The heating device according to claim 7, wherein
the connection portion of the conductive member has a cutout conforming to a shape of the detector, and
the detector is received in the cutout conforming to the shape of the detector.

9. The heating device according to claim 6, wherein
the conductive member is further configured such that when the bulge portion of the conductive member is attached to the recess of the heated object, the conductive member exposes at least one surface of the bulge portion of the heated object, and
the portion of the heater is in contact with the at least one surface of the heated object.

10. A method of a heating device for heating a heated object that requires to be heated and has an uneven exterior shape, the heating device including a heater, and the method comprising:

preparing a conductive member having thermal conductivity and being configured to be attached to a recess of the heated object, wherein the conductive member includes a connection portion and a bulge portion, the bulge portion of the conductive member having a shape conforming to a shape of the recess of the heated object, wherein the bulge portion of the conductive member includes: a first portion having a first surface that is directly adjacent to a first side of the heater; a second portion having a second surface that is directly adjacent to the first side of the heater; and a third surface that is in contact with a first side of the connection portion, wherein the first side of the connection portion is positioned opposite to a second side of the connection portion, and the second side of the connection portion is in direct contact with a second side of the heater, which is opposite to the first side of the heater, and wherein a cutout is formed between the first portion and the second portion;

attaching the bulge portion of the conductive member to the recess of the heated object, wherein a pipe of the heated object is disposed in the cutout between the first portion and the second portion, each of the first portion and the second portion extending in a first direction towards the pipe from a proximal portion of the bulge portion of the conductive member, the pipe having a first end and a second end on an outer periphery surface of the pipe, the first end and the second end being located at ends in the first direction on the outer periphery surface of the pipe, the first end and the second end being respectively located on two opposing sides separated by a diameter of the pipe, the diameter extending in a second direction perpendicular to the first direction, and each of the first portion and the second portion extending beyond both of the first end and the second end on the outer periphery surface of the pipe of the heated object in the first direction;

covering the heated object and the conductive member with a heater;

making a portion of the heater being in contact with the bulge portion of the heated object; and heating the heated object directly with the portion of the heater in contact with the heated object by heat generated from the heater, and heating the heated object through the conductive member with a portion excluding the portion of the heater in contact with the heated object.

11. The heating device according to claim 1, wherein
the bulge portion of the heated object includes adjacent valve casings, the recess of the heated object is formed between the adjacent valve casings, and each of the first portion and the second portion is configured to be located within the recess formed between the adjacent valve casings.

12. The heating device according to claim 1, wherein
the first surface of the first portion is in direct contact with the first side of the heater, and
the second surface of the second portion is in direct contact with the first side of the heater.

\* \* \* \* \*